United States Patent
De Angelis et al.

(10) Patent No.: US 11,708,539 B2
(45) Date of Patent: Jul. 25, 2023

(54) REMOVAL OF SOUR GASES FROM GAS MIXTURES CONTAINING THEM

(71) Applicant: ENI S.P.A., Rome (IT)

(72) Inventors: Alberto Renato De Angelis, San Donato Milanese (IT); Giuseppe Bellussi, San Donato Milanese (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 17/274,835

(22) PCT Filed: Sep. 9, 2019

(86) PCT No.: PCT/EP2019/073923
§ 371 (c)(1),
(2) Date: Mar. 10, 2021

(87) PCT Pub. No.: WO2020/053116
PCT Pub. Date: Mar. 19, 2020

(65) Prior Publication Data
US 2022/0056361 A1    Feb. 24, 2022

(30) Foreign Application Priority Data
Sep. 10, 2018  (IT) .......... 102018000008452

(51) Int. Cl.
*C10L 3/10*    (2006.01)
*B01D 53/14*   (2006.01)
*B01D 53/62*   (2006.01)
*B01D 53/78*   (2006.01)

(52) U.S. Cl.
CPC .......... *C10L 3/104* (2013.01); *B01D 53/1425* (2013.01); *B01D 53/1475* (2013.01); *B01D 53/1493* (2013.01); *B01D 53/62* (2013.01); *B01D 53/78* (2013.01); *C10L 3/103* (2013.01); *B01D 2252/202* (2013.01); *B01D 2252/2053* (2013.01); *B01D 2252/2056* (2013.01); *B01D 2252/504* (2013.01); *B01D 2257/504* (2013.01); *B01D 2258/0283* (2013.01); *C10L 2290/541* (2013.01)

(58) Field of Classification Search
None
See application file for complete search history.

(56) References Cited

U.S. PATENT DOCUMENTS

| 4,100,257 A | 7/1978 | Sartori et al. |
| 2016/0325225 A1 | 11/2016 | Esser-Kahn |

FOREIGN PATENT DOCUMENTS

| CA | 3000030 A1 | 4/2017 | |
| CN | 108479309 A | * 9/2018 | ............ B01D 53/14 |
| KR | 20140139821 A | 12/2014 | |

OTHER PUBLICATIONS

Internet Archive page for Microkat info, page for N,N-dimethylformamide. Viewed on Sep. 8, 2022 at https://web.archive.org/web/20220000000000*/http://www.microkat.gr/msdspd90-99/N%2CN-Dimethylformamide.html.*

Internet Archive page for LSU.edu info, page for DMSO (original page published on Sep. 5, 2006). Viewed on Sep. 9, 2022 at https://web.archive.org/web/20060905205717/https://macro.lsu.edu/HowTo/solvents/DMSO.htm.*

He et al., "One-pot synthesis of dispersible thermally stable organic downconversion materials under DBU catalyzation for high performance hybrid-LED lamps." Green Chem., 2018, 20, 3557-3565 (published Jun. 25, 2018).*

Nanta Phawinee et al; "Dissolution and Modification of Cellulose using High-Pressure Carbon Dioxide Switchable Solution"; Journal of Supercritical Fluids; vol. 130; Jul. 22, 2017; pp. 84-90.

International Search Report dated Nov. 7, 2019 for PCT application No. PCT/EP2019/073923.

Written Opinion dated Nov. 7, 2019 for PCT application No. PCT/EP2019/073923.

* cited by examiner

*Primary Examiner* — Daniel Berns
(74) *Attorney, Agent, or Firm* — Ruggiero McAllister & McMahon LLC

(57) ABSTRACT

There is an absorbent mixture usable for the removal of sour gases from gas mixtures. The mixture has at least one organic base having a $pK_b$ (in water) less than or equal to 3.2; at least one alcoholic solvent of general formula $R(OH)_n$ having a boiling temperature above or equal to 100° C. at ambient pressure, wherein R is a linear or branched saturated alkyl group having a number of carbon atoms between 2 and 20 and n is a whole number varying between 1 and 20; an aprotic polar solvent having a dielectric constant $\varepsilon$ at 25° C. greater than or equal to 30, a viscosity $\mu$ at 25° C. less than or equal to 14 cP, preferably less than or equal to 12 cP; and a boiling temperature at normal pressure equal to or above 130° C. There is also a process for the removal of sour gases using the absorbent mixture.

18 Claims, No Drawings

REMOVAL OF SOUR GASES FROM GAS MIXTURES CONTAINING THEM

CROSS-REFERENCE TO RELATED APPLICATIONS

The present application claims priority based on PCT Application No. PCT/EP2019/073923, filed Sep. 9, 2019, which claims priority based on Italy Application No. 102018000008452, filed Sep. 10, 2018, both of which are incorporated herein in their entireties.

FIELD OF THE DISCLOSURE

The present disclosure relates to a process for the removal of acidic gases (or "sour gases", the most commonly used term) from gas mixtures containing them. In particular, the present disclosure relates to a process for the removal of sour gases present in natural gas, air and combustion gases.

DESCRIPTION OF THE RELATED ART

Sour gases, such as for example $CO_2$, $H_2S$, COS or mixtures thereof, are contained in numerous gases or gas mixtures present in the natural environment (air) or produced industrially. The presence or emission of sour gases is disadvantageous in that these gases are responsible for many harmful or damaging phenomena such as corrosion, acid rain, poisoning, lung disease, the greenhouse effect, etc. Controlling and/or eliminating them is more than ever a topical issue in terms of safety and combating climate change.

Natural gas, for example, typically contains sour gases that are properly eliminated for the purpose of removing toxic substances ($H_2S$, COS), increasing calorific value ($CO_2$ removal), reducing corrosion problems ($H_2S$) and remove bad-smelling substances ($H_2S$ and mercaptans).

Natural gas, as reported in the article "Natural gas" by G. Hammer et al., in volume 17 of Ullmann's Encyclopedia of Industrial Chemistry, is usually composed of methane as its main component, accompanied by other hydrocarbons, both aliphatic and to a lesser extent aromatic. Other non-hydrocarbon components of methane are: nitrogen, carbon dioxide, $H_2S$, mercaptans and helium. For example, it can be noted that there are gases (Groningen, Netherlands) in which the $H_2S$ content is below the threshold limit [1 ppm by volume], while in other gas fields, such as Ekofisk in Norway, the $H_2S$ content is 100 ppm by volume, rising to 8% by volume in the Oldenburg gas fields in Germany, 16% in the Tenguiz gas fields in Russia, and 90% in the Bearberry gas fields in Canada. By convention, "super-sour" natural gases are defined as having a $H_2S$ content of more than 30% by volume.

A large amount of $CO_2$ is produced in industrial processes and in combustion, such as, for example, diesel or Otto cycle (petrol) engines, in cement factories, in the steel industry and in thermoelectric power plants, and is released into the environment where it contributes to increased heating of the biosphere.

The selective absorption of $H_2S$ and/or of $CO_2$ is becoming in recent times the subject of an ever-increasing number of study and research projects and industrial applications, especially in the field of natural gas purification and emissions abatement, as well as in the purification of non-hydrocarbon gases, such as gases resulting from coal gasification processes and tail gases of Claus plants.

Numerous methods and cycles of sour gas scrubbing have been proposed in the past, the efficiency of which can attain a residual sour-gas content in the purified gas stream of the order of ppm and, in some cases, of the order of ppb.

The most widely used systems for washing gaseous mixtures to remove sour gases present therein consist of a treatment with an aqueous solution of amines, whose composition depends on the relative content of $CO_2$ and/or $H_2S$, followed by a possible treatment to remove mercaptans, in particular for natural gas, depending on the amount in which they are present (such as absorption on sieves or treatments with strongly alkaline solutions, followed by oxidation with cobalt complexes). For example, aqueous solutions of methyl diethanolamine (MDEA) are used, which are resistant to both thermal and chemical degradation, are non-corrosive and have a low heat of reaction with $H_2S$ and $CO_2$. In addition, MDEA mixes poorly with hydrocarbons and does not form carbamates such as primary and secondary amines, due to the absence of nitrogen-bound hydrogen atoms. Washing with MDEA solutions is therefore of great importance in the purification of gases with high concentrations of acidic compounds, due to the reduced operational energy requirement, high productivity and excellent stability. Its principal disadvantage is the lower propensity to absorb $CO_2$. Where a high-percentage carbon dioxide removal is also required, it is possible to add one or two more reactive amines, primary or secondary (MEA (methyl ethylamine) or DEA (diethylamine), which can greatly improve the total reaction rate of the solution without affecting the advantageous properties of the MDEA; in this case, the costs of the process and the degradation of primary amines that are thermally less stable than MDEA obviously increase.

As an alternative to aqueous solutions of alkanolamines for the absorption of $CO_2$, a number of liquid absorbent systems based on other solvents have been proposed. Alkanolamines and amines have been combined with alcohols, diols and cyclic carbonates in various publications, to form "hybrid solvents" whose reaction mechanisms and kinetics have been studied in the literature, such as, for example, in Alvarez-Fuster, et al., Chem. Ing. Sci. 1981, 36, 1513; Ali, et al., Separation and Purification Technology 2000, 18, 163; Usubharatana, et al., Energy Procedia 2009, 1, 95; and 15-11-2017 2 Park, et al., set. Sci. Technol. 2005, 40, 1885.

Ionic liquids are another non-aqueous solvent, currently in the developmental phase. They are generally composed of pairs of ions that are in a liquid state close to ambient temperature in the absence of other solvents. Although they have low regeneration requirements (temperature, energy), they have not surpassed aqueous solutions of amines in terms of performance, due to factors such as the low load capacity of $CO_2$ at low pressures and high viscosity, as well as high cost, which has to date hindered the industrial development for such use.

The use of a non-aqueous liquid solvent to separate $CO_2$ from gas mixtures containing water vapour can lead to the accumulation of $H_2O$ in the liquid solution both as a monophasic and as a biphasic solution, depending on the process conditions (e.g. pressure, temperature, $H_2O$ concentration), and the affinity of the non-aqueous solvent for $H_2O$. $H_2O$ build-up is detrimental to the $CO_2$ separation and purification process, as more energy is needed for solvent regeneration due to the need for continuous removal of water from the solvent.

Another group of non-aqueous liquids that have been proposed for resolving many of the problems affecting the separation of $CO_2$ from gaseous mixtures containing it are ionic liquids that can be switched to room temperature. These are equimolar mixtures of nitrogenated bases of amidine or guanidine and alcohols, which, as such, constitute non-ionic liquids at room temperature, but form ionic liquids by reaction with $CO_2$ at room temperature. Typically, the conductivity of switchable ionic liquids increases by one or two orders of magnitude when $CO_2$ is added.

It is important to underline that these solvents allow higher $CO_2$ loads than some aqueous amines and can be regenerated under milder conditions.

$CO_2$ is captured through the formation of alkyl carbonates according to the following reaction mechanism:

The mechanism indicated in the previous reaction is possible for a generic $XO_2$ formula molecule, where X is, as in the previous case, C, or X=S or N.

Patent application US2012/060686 describes a system for absorbing $CO_2$ from gas mixtures from combustion using a combination of a strong nitrogenated base such as DBU or guanidine and a less basic alkylamine such as aniline or piperidine, possibly in the presence of organic solvents such as toluene, tetrahydrofuran or dimethyl sulfoxide (DMSO). The text mentions the formation of carbamates during the absorption of $CO_2$.

Conversely, the formation of carbonates or carbamates is not possible for other acid molecules present in natural gas such as $H_2S$, which can in any case be captured by salification, given the high basicity of some of the compounds used in the technique for the formation of ionic liquids, but often in unsatisfactory quantities, especially in the case of high concentrations of $H_2S$ and/or of a requirement to obtain low residual concentrations of $H_2S$, for example less than 1000 ppm.

Ionic liquids also have the disadvantage of significantly increasing their viscosity when the concentration of $CO_2$ or other sour gas absorbed is very high, thus making the separation process more onerous, in terms of pressures and energy required for their handling.

It would therefore be advantageous to formulate a new process capable of effectively removing sour gases, allowing even higher absorption efficiency, lower viscosity increase of the fluid during absorption and easy subsequent separation of the gases, for example at relatively low temperatures, to allow easy regeneration and recycling of the washing solution in industrial processes.

SUMMARY OF THE DISCLOSURE

The Applicant has therefore set the goal of obtaining in a single step the removal from gaseous currents of all sour gases and possibly also of other undesirable substances such as mercaptans, with a simplification of the plant layout, avoiding strongly alkaline substances (corrosive and having a high environmental impact), furthermore necessitating a lower energy consumption for regeneration of the absorbent solution.

The Applicant has now surprisingly found that the above-mentioned problems and drawbacks can be easily overcome by the use of particular non-aqueous ternary compositions.

Therefore, a subject of the present disclosure is an absorbent mixture that can be used for the removal of sour gases from mixtures of gases containing them, comprising:
(A) at least one alcohol of general formula $R(OH)_n$ having a normal boiling point equal to or higher than 100° C., wherein R is an alkyl or alkyl aromatic group, linear or branched, possibly substituted, having a number of carbon atoms comprised between 2 and 20, and n is a variable whole number between 1 and 20.
(B) at least one organic base having a $pK_b$ (in water) less than or equal to 3.2;
(C) an aprotic polar solvent having a dielectric constant c at 25° C. greater than or equal to 30, a viscosity μ at 25° C. less than or equal to 14 cP (centipoise), preferably less than or equal to 12 cP, and a normal boiling point equal to or above 130° C.

A second subject of the present disclosure is also a process of removing sour gases from a gaseous mixture containing them, including the following steps in sequence:
(a) placing said gaseous mixture, at a temperature comprised between 0° C. and 70° C. and preferably at a pressure comprised between 50 kPa and 15 MPa, in contact with a solvent system comprising an absorbent mixture according to the present disclosure, to obtain a purified gaseous mixture and a liquid solution comprising at least part of said sour gases;
(b) separating the purified gaseous mixture from said liquid solution;
(c) regenerating the solvent system usable in step (a) and forming a gaseous mixture comprising said sour gases.

DETAILED DESCRIPTION OF THE DISCLOSURE

In a preferred embodiment, the gaseous mixture treated with the process of the present disclosure is made up of natural gas.

In a second embodiment of the process of the present disclosure, said gaseous mixture is an exhaust gas of a combustion process.

The scope of the present patent application should also be considered to comprise the embodiments of the claimed disclosure, wherein the term "comprising" is to be interpreted as "which consists essentially of" or "which consists of", even if not explicitly stated.

The scope of the definition of any component or compound comprising more than one single element should also be considered to comprise mixtures in any way obtained between two or more of said elements, unless otherwise specified.

In the present description and in the claims, the term "normal boiling point" means the boiling temperature of a liquid at a pressure of 0.1013 MPa (1 atm).

Unless otherwise specified, the extreme values of the numerical ranges, however defined, are to be considered comprised within the scope of the range.

According to the present disclosure, components A), B) and C) are comprised in said absorbent mixture preferably in the following proportions by weight:
B/A comprised between 0.1 and 1.5, more preferably between 0.3 and 1;
C/A comprised between 0.1 and 2, more preferably between 0.5 and 1.5.

Said organic base B) of the absorbent mixture according to the present disclosure can generally be selected from among the strong organic bases having low volatility, that is, generally having a normal boiling point at least higher than 100° C., preferably higher than 130° C., more preferably comprised between 130° C. and 300° C.

Preferably said organic base B) has a $pK_b$ comprised between 0.3 and 3, more preferably comprised between 0.5 and 2, where $pK_b$, according to the known definition in chemistry, is understood to mean the antilogarithm of the dissociation constant of said organic base B) in water.

Preferably said organic base B) is a nitrogenated organic compound with low volatility, comprising from 5 to 25, preferably from 5 to 20 atoms of C and from 1 to 10, preferably from 2 to 6, atoms of N.

A preferred group of organic bases B) according to the present disclosure are organic bases not containing any hydroxy group —OH in their formula.

Advantageously said organic base B) has the following general formula (I):

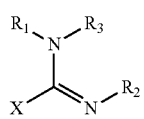

(I)

wherein:

$R_1$ is a linear or branched C1-C5 alkyl group; or it is an aryl group with 6 to 10 carbon atoms, optionally substituted with a linear or branched C1-C5 alkyl group; or together with X it forms a saturated or unsaturated ring of 5 to 9 members;

$R_3$ is a C1-C5 alkyl group, linear or branched; or it is an aryl group with 6 to 10 carbon atoms, optionally substituted with a linear or branched C1-C5 alkyl group; or together with $R_2$ it forms a ring of 5 to 7 members;

X is the group —$NR_4R_5$, or a C1-C5 alkyl group, linear or branched, or X may represent a group of formula (II):

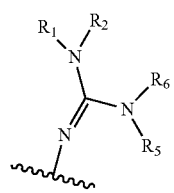

(II)

$R_2$ is hydrogen, a linear or branched C1-C5 alkyl group; or together with $R_3$ it forms a ring of 5 to 7 members comprising at least two nitrogen atoms; or it is an aryl group with 6 to 10 carbon atoms, optionally substituted with at least one linear or branched C1-C5 alkyl group; or it is a C7-C12 alkylaryl group, such as, for example benzyl; or $R_2$ may represent a group of formula (III):

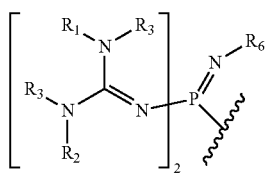

(III)

wherein:

the graphic symbol "⸺" represents the group in formula (I) to which X or $R_2$ is bound;

$R_4$ is a C1-C5 alkyl group, linear or branched;

$R_5$ is a C1-C5 alkyl group, linear or branched;

$R_6$ is hydrogen or a C1-C5 alkyl group, linear or branched;

and mixtures thereof.

Aryl group is understood to mean phenyl or naphthyl.

In a preferred aspect of the present disclosure $R_1$, $R_3$, $R_4$, $R_5$ and $R_6$ correspond to a methyl group and $R_2$ is hydrogen or methyl.

The organic bases of formula (I) are advantageously chosen, for example, from 1,5-diazabicyclo(5.4.0)undec-5-ene (DBU) [$pK_b$ 1,1], 1,5-diazabicyclo[4.3.0]non-5-ene (DBN) [$pK_b$ 0.5], 1,1,3,3-tetramethylguanidine (TMG) [$pK_b$ 0.4], biguanide derivatives (1-(diaminomethylidene) guanidine) such as N''-[(dimethylamino)(methylimino)methyl]-N,N,N',N'-tetramethylguanidine, 1,8-bis-(tetramethylguanidino)naphthalene, phosphazene-type compounds such as N-[bis(dimethylamino)-[methylimino-bis[[tris(dimethylamino)-λ5-phosphanylidene]amino]-λ5-phosphanyl]imino-λ5-phosphanyl]-N-methylmethanamine (also known as N'',N''''',N'''''''-phosphinimylidinetris [N,N,N',N'-tetramethylguanidine]), or mixtures thereof, as illustrated below.

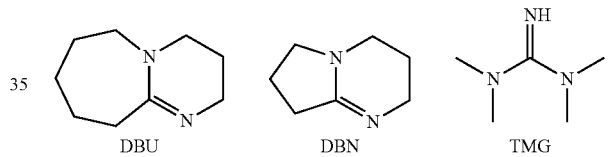

DBU     DBN     TMG

N''-[(dimethylamino)(methylimino)methyl]-N,N,N'N'-tetramethylguanidine

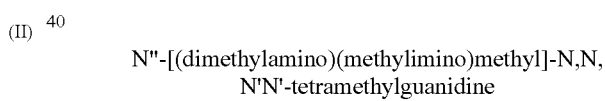

1,8-bis(tetramethylguanidino)naphthalene

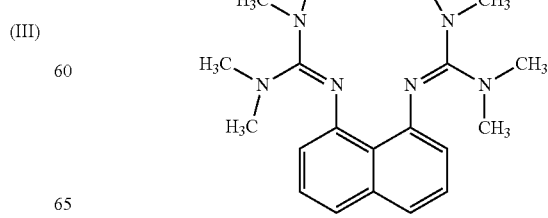

N'',N'''',N''''''-phosphinimylidinetris[N,N,N'N'-tetramethylguanidine]

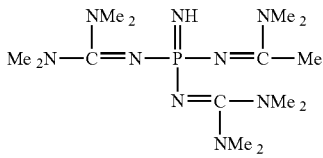

Other organic bases B) suitable for the present disclosure are, for example, quinuclidine (1-azabicyclo[2.2.2]octane) and 1,8-bis(tetramethylamino)naphthalene (N,N,N'N-tetramethyl-1,8-diaminonaphthalene).

Particularly preferred organic bases B) are the cyclic amidines having $pK_b$ comprised between 0.3 and 3, like the said DBU, DBN, quinuclidine, etc.

Numerous examples of possible organic bases can be found in bibliographical reference: "Superbase for organic synthesis" edited by T. Ishikawa, publishers Wiley and sons, 2009.

According to the present disclosure, the alcohol A) of formula $R(OH)_n$ has a normal boiling point equal to or above 100° C., preferably comprised between 110 and 250° C.

Said group R in alcohol A) of formula $R(OH)_n$ is preferably an alkyl group having from 2 to 20, more preferably from 2 to 12, carbon atoms, or an alkylaromatic group having from 7 to 20, more preferably from 7 to 15 carbon atoms. Said group R can optionally be substituted with from 1 to 5 halogen atoms, preferably Cl or F, more preferably F.

According to a preferred aspect of the present disclosure, said group R does not contain nitrogen atoms.

Said index n indicates the number of —OH groups bound to a carbon atom at any position of the alcohol having formula $R(OH)_n$ in the absorbent mixture of the present disclosure. "n" is preferably comprised between 1 and 5.

Classes of alcohols advantageously usable as component A) of the absorbent mixture of the present disclosure are:
  aliphatic alcohols, linear or branched, possibly fluorinated, having only one —OH group (n=1) and from 4 to 20, preferably from 5 to 15, carbon atoms;
  aliphatic polyols having from 2 to 10, preferably from 2 to 5, —OH groups (n from 2 to 10, preferably 2 to 5) and 2 to 20, preferably 2 to 10 carbon atoms;
  alkylaromatic alcohols having 1 to 3 aliphatic —OH groups (n from 1 to 3) and 7 to 15 carbon atoms, comprising at least one aryl group.

Preferred alcohols A) for the formation of the absorbent mixture according to the present disclosure are butanol, hexanol, heptanol and octanol among the monoalcohols, hexanediol, ethylene glycol and propylene glycol among the diols, glycerin among the triols, benzyl alcohol among the alkylaromatics, 2,2,3,3-tetrafluoropropanol among the fluorinated alcohols.

In the absorbent mixture of the present disclosure, the ratio between the moles of OH groups of alcohol A) and the moles of base B) in the reaction mixture is preferably comprised between 10/1 and 1/1, more preferably comprised between 10/1 and 2/1.

The aprotic polar solvent C) comprised in the absorbent mixture according to the present disclosure is an organic or inorganic, preferably organic compound, preferably liquid at a temperature of 15° C., having the following essential characteristics:

Dielectric constant s at 25° C. greater than or equal to 30, preferably comprised between 35 and 60;
a viscosity μ at 25° C. less than or equal to 14 cP, preferably comprised between 2 and 12 cP, and
a boiling temperature at normal pressure equal to or above 130° C., preferably higher than 150° C.

Aprotic polar solvents C) adapted for the formation of the absorbent mixture of the present disclosure can be selected by the person skilled in the art from among the liquids (at 15° C.) having the above characteristics and which are not reactive towards one of the components present in the gas mixture to be treated for the removal of sour gases. For example, they must not give a hydrolysis reaction if placed in contact with water.

Sulfoxides, sulfones and nitro aromatic compounds are preferred as classes of compounds.

Among the aprotic polar solvents, dimethyl sulfoxide (DMSO), sulfolane (SO) and nitrobenzene (NB) are particularly preferred for the present disclosure, the characteristics of which are shown in the following table 1.

TABLE 1

| Aprotic polar solvent | ε (at 25° C.) | Normal Boiling Temperature (° C.) | μ (at 25° C. in cP) |
|---|---|---|---|
| DMSO | 47 | 189 | 3.9 |
| SO | 43 | 287 | 10 |
| NB | 34 | 211 | 4.0 |

According to the present disclosure, most preferred absorbent mixtures do not contain in significant amounts (less than 1% by weight) solvents C) comprising amide groups, in particular dimethylformamide (DMF). Compositions comprising solvents with amide groups have shown a less preferable combination of features like dielectric constant and boiling point.

The absorbent mixture according to the present disclosure is usable to conduct a process of removing sour gases from a gaseous mixture containing them, which is also a subject of the present disclosure, comprising the following stages in sequence:
  (a) placing said gaseous mixture, at a temperature comprised between 0° C. and 70° C. and preferably at a pressure comprised between 50 kPa and 15 MPa, in contact with a solvent system comprising an absorbent mixture according to the present disclosure to obtain a purified gaseous mixture and a liquid solution comprising at least part of said sour gases;
  (b) separating the purified gaseous mixture from said liquid solution obtained in stage (a);
  (c) regenerating the solvent system usable in stage (a) and forming a separate gaseous mixture comprising said sour gases, preferably by heating said liquid solution separated in stage (b).

The above sour gas removal process can be conducted in a continuous or discontinuous reactor, according to the known processing techniques. The absorption stage (a) can be conducted in any apparatus conventionally used for this purpose such as an absorption tower, an autoclave or others. The person skilled in the art can easily size the apparatus on the basis of the prior knowledge for this type of unitary operation and the characteristics of the solvent system used in the disclosure (viscosity, absorption capacity at saturation, etc.).

The process which is the subject of this disclosure allows the removal of all unwanted substances in a single step, with a simplification of the plant layout, also requiring lower energy consumption for the regeneration of the absorbent mixture.

The process of removing undesirable sour gases by absorption in the solvent system comprising the absorbent mixture of the present disclosure takes place in step (a) by treating the starting gaseous mixture with said solvent system, at temperatures comprised between 0° C. and 70° C., preferably between 10 and 60° C., and at pressures comprised between 50 kPa and 15 MPa, preferably between 100 kPa and 5 MPa. The gaseous mixture is purified (also termed "softened"), by removing the unwanted substances, and can then be used in the desired manner. In continuous, fully operational industrial applications, the solvent system fed at stage (a) is preferably largely formed by the solvent system regenerated at stage (c) of the present process, except for the make-up part, if any. Said solvent system can also comprise, in addition to the absorbent mixture according to the present disclosure, a residue of sour gases not separated in step (c). It is also possible that the solvent system used in stage (a) also comprises up to 20% by volume of an inert diluent other than the aprotic polar solvent, in order to further improve the low viscosity characteristics of the mixture. Appropriately, this diluent is selected from among the aliphatic or aromatic organic liquids, miscible with the absorbent mixture of the present disclosure, having a boiling temperature above 120° C., preferably above or equal to 150° C.

The process according to the present disclosure can therefore comprise an optional additional step (d) in which said solvent system regenerated in step (c) is recycled to said step (a).

In step (a) the solvent system and the gaseous mixture containing the sour gases are advantageously placed in contact, according to one of the known methods for the extraction and absorption processes of this type, in equicurrent or countercurrent, dispersing the gaseous mixture in the liquid to maximise the contact between the two phases, for example by stirring and dispersion of the gas in the liquid or trickling in and nebulisation of the liquid in the gas. The contact time of the two phases can be selected by the person skilled in the art on the basis of known parameters of absorption kinetics, or by simple preliminary measurements, and is normally comprised between 1 and 100 minutes, preferably between 2 and 30 minutes.

The amount of sour gases absorbed in step (a) may vary within broad limits depending on the characteristics of the solvent system, of the pressure and of the concentration of sour gases in the feed gaseous mixture, as well as on the system temperature and on the contact time. In general, action is taken to bring the solvent system close to the degree of saturation under the selected operating conditions and in such a way that in the purified gaseous mixture there is the smallest possible quantity of residual sour gas, preferably below the maximum values allowed to specification.

In stage (a), if present, $H_2S$ must be removed from the purified gaseous mixture to very low final values, in many cases not exceeding 10 ppm.

In stage (b) of the process according to the present disclosure, the separation of the purified gaseous mixture from the liquid solution formed by absorption and of the sour gases in the solvent system is carried out. This separation of stage b) can also take place contextually with the absorption reaction a), in a single specially designed reactor, in which, for example, the gaseous mixture containing the sour gases is fed in from below and is placed in continuous countercurrent contact with the absorbent mixture fed in at the head of the reactor and flowing downwards by gravity. In a second, non-limiting embodiment of the present disclosure, the biphasic mixture formed by mixing of the gaseous mixture with the solvent system can be separated in a chamber different from the absorption chamber, optionally with the support of a centrifugation system.

In stage (c) of the process according to the present disclosure, the liquid solution obtained in stage (b) or in stages (a)+(b) contextually is treated in such a way as to regenerate the solvent system usable in stage (a) and form a separate gaseous mixture containing the sour gases.

According to a preferred embodiment, in stage (c) the liquid solution from stage (b) is heated to temperatures sufficient to remove the desired amount of sour gases, preferably comprised between 70° C. and 180° C., more preferably between 80° C. and 150° C., and even more preferably between 90° C. and 130° C.

The solvent system thus regenerated, containing the absorbent mixture, can be recycled to step (a) of absorption. Optionally, the person skilled in the art may also use an inert gas stream, such as nitrogen or methane, in step (c) to facilitate the removal of sour gases from the liquid solution.

Stage (c) can be advantageously conducted at a pressure lower than that of stage (a) to facilitate the removal of absorbed gas. In some cases, the person skilled in the art may also conduct stage (c) at a temperature substantially equal to that of stage (a) or slightly higher, but operating at pressures lower than stage (a) or even applying pressures below atmospheric (vacuum). According to a preferred embodiment, stage (c) may comprise rapid evaporation (better known as "flash") of the sour gases contained in the liquid solution, by rapidly reducing the pressure under adiabatic or semi-adiabatic conditions. The liquid mixture cools down, yielding heat for the separation of the sour gases. This embodiment is particularly advantageous when the liquid mixture separated in stage (b) is at relatively high temperatures, preferably comprised between 40 and 70° C. For this purpose, the present process may optionally comprise a step of preheating of the liquid solution between stage (b) and stage (c) to temperatures between 70 and 150° C.

The person skilled in the art advantageously selects the temperatures of absorption of step (a) and of desorption of step (c) as a function of the characteristics of the solvent system used, preferably so that the absorption temperature is lower than the desorption temperature, more preferably with a difference of at least 20° C.

Step (c) is advantageously conducted in such a way that all or most of the sour gas contained in the liquid solution separated in (b) is removed and separated. Normally, over 90%, preferably over 95% of the gas in said liquid solution is separated in step (c).

For example, in step (c), advantageously, not all $CO_2$ is removed from the regenerated absorbent mixture; rather, a small amount, usually from traces up to 1.9% by weight referred to the weight of the regenerated solvent system, can remain absorbed in the solvent system, in order not to have to use extreme desorption conditions and make the process economically less advantageous.

The process that is the subject of the present disclosure, as previously illustrated, allows a reduction in the content of sour gases in a gaseous mixture up to values below 1000 ppm, preferably below 500 ppm, more preferably below 100 ppm, the quantities being calculated by volume, assuming the ideal nature of the gaseous mixtures. In case the sour gas is or comprises $H_2S$, the process of the present disclosure allows advantageously the specification values for natural gas to be achieved, as well as for exhaust or combustion gases, with a reduced energy consumption. Indeed, it was surprisingly found that the amount of sour gas absorbed in step a), for equal volume of absorbent mixture, is much greater than expected on the basis of the rule of addition of the individual components. In other words, as better illustrated in practice in the examples that follow, a volume composed, for example, of one litre of DBU, 1-hexanol, DMSO mixture, in proportions by weight of 50/100/100, absorbs much more sour gas than one litre of DMSO or one litre of DBU/1-hexanol mixture in proportions of 50/100.

Even more surprisingly, it was found that the viscosity of the absorbent mixture increases much less during absorption than, for example, an ionic liquid mixture of the prior art such as DBU/1-hexanol.

The process according to the present disclosure is also usable for the removal of other undesirable compounds present in natural gas, such as for example mercaptans, up to values below 30 ppm, preferably below 15 ppm, more preferably below 5 ppm.

A further advantage of the process of the present disclosure is that the solution used for absorption of sour (acid) gas can be regenerated at temperatures lower than those conventionally applied for the regeneration of amine solutions, with an appreciable energy saving.

For example, the solution made up of DBN with addition of hexanol and DMSO can already be completely regenerated at 80° C., while the best temperature for regeneration of an MDEA solution is comprised between 120° C. and 130° C. A further advantage of this process with respect to the state of the art, constituted by the use of alkanolamines in water, is made up of the low volatility of the constituents of the absorbent mixture, so that in the regeneration step, which takes place at lower temperatures than the industrial process, there is no loss of volatile products in the output gas.

The following example embodiments are provided merely to illustrate the present disclosure and are not to be understood in a sense limiting the scope of protection defined by the appended claims.

EXAMPLES

Solvents and Reagents
Dimethyl sulfoxide (DMSO; >99%; Sigma-Aldrich)
1,5-diazabicyclo(5.4.0)undec-5-ene (DBU; >99%; Sigma-Aldrich)
1,5-diazabicyclo[4.3.0]non-5-ene (DBN; >99%; Sigma-Aldrich)
1,1,3,3-tetramethylguanidine (TMG; >99%; Sigma-Aldrich)
Monoethanolamine (MEA; >99%; Sigma-Aldrich)
Methyldiethanolamine (MDEA; >99%; Sigma-Aldrich)
1-Hexanol (>99%; Sigma-Aldrich)
Carbon dioxide ($CO_2$; pure gas; SIAD).

Example 1: Absorption of Sour Gas ($CO_2$) with DBU-Hexanol-DMSO 50 g (0.328 moles) of DBU, 100 g (0.846 moles) of hexanol and 100 g of dimethyl sulfoxide (0.978 moles) are loaded into an autoclave of 500 cc capacity. The mixture is stirred, the autoclave closed, and vacuum is applied at room temperature, then the mixture is heated to 40° C. The free volume of the autoclave (about 250 cc) is then filled with $CO_2$ at a pressure of 40 bar and a rapid absorption of the gas is noted. The autoclave is recharged with $CO_2$ at 40 bar until there is no longer any absorption of $CO_2$ and the pressure remains constant. The amount of $CO_2$ absorbed is measured, and found to be equal to 200 g/l.

The viscosity of the system, at 40° C., increases from 3 to 6 cP after absorption of $CO_2$.

Example 2 (Comparative): Absorption of Sour Gas ($CO_2$) with DBU-Hexanol 83 g (0.547 moles) of DBU and 167 g (1.635 moles) of hexanol are loaded into an autoclave of 500 cc capacity. The mixture is stirred and the autoclave closed, then vacuum is applied at room temperature and then the mixture heated to 40° C. The free volume of the autoclave (about 250 cc) is then filled with $CO_2$ at a pressure of 40 bar and a rapid absorption of the gas is noted. The autoclave is reloaded with $CO_2$ at 40 bar until there is no longer any absorption of $CO_2$ and the pressure remains constant. The amount of $CO_2$ absorbed is measured, and found to be equal to 110 g/l.

The viscosity of the system, at 40° C., increases from 9 to 82 cP after absorption of $CO_2$.

Example 3 (Comparative): Absorption of Sour Gas ($CO_2$) with DMSO 250 g (1.642 moles) of DMSO is loaded into an autoclave of 500 cc capacity. It is heated to 40° C., and the autoclave is closed, then vacuum is applied.

The free volume of the autoclave (about 250 cc) is then filled with $CO_2$ at a pressure of 40 bar and a rapid absorption of the gas is noted. The autoclave is recharged with $CO_2$ at 40 bar until there is no longer any absorption of $CO_2$ and the pressure remains constant. The amount of $CO_2$ absorbed is measured, and found to be equal to 147 g/l.

Example 4 (Comparative): Absorption of Sour Gas ($CO_2$) with MEA-20%

250 g of an aqueous solution of methanolamine of 20% by weight, an industrial solution for the absorption of $CO_2$, is loaded into an autoclave of 500 cc capacity. Heating is carried out to 40° C. and the autoclave closed.

The free volume of the autoclave (about 250 cc) is then filled with $CO_2$ at a pressure of 40 bar and a rapid absorption of the gas is noted. The autoclave is recharged with $CO_2$ at 40 bar until there is no longer any absorption of $CO_2$ and the pressure remains constant. The amount of $CO_2$ absorbed is measured, and found to be equal to 56 g/l.

Example 5: Absorption of Sour Gas ($CO_2$) with DBU-hexanol-SO 50 g (0.328 moles) of DBU and 100 g (0.846 moles) of hexanol and 100 g (0.832 moles) of sulfolane are loaded into an autoclave of 500 cc capacity. The mixture is stirred and the autoclave closed, then vacuum is applied at ambient temperature and then the mixture is heated to 40° C. The free volume of the autoclave (about 250 cc) is then filled with $CO_2$ at a pressure of 40 bar and a rapid absorption of the gas is noted. The autoclave is recharged with $CO_2$ at 40 bar until there is no longer any absorption of $CO_2$ and the pressure remains constant. The amount of $CO_2$ absorbed is measured, and found to be equal to 170 g/l.

The viscosity of the system, at 40° C., increases from 4.5 to 8.2 cP after absorption of $CO_2$.

Example 6 (Desorption)

The liquid solution, in which the acid components are dissolved, obtained as described in example 5 above, is sent to a regeneration column operating at a temperature of 110° C., in which stripping can be carried out by means of a nitrogen feed. In this column the solvent system is regenerated from the liquid solution, so that the acid components ($CO_2$) are desorbed and removed in a current of nitrogen at the head of the regeneration column to be sent to the next sections of treatment, such as, for example, compression and liquefaction of the $CO_2$ for subsequent reinjection into an underground formation, or its use for the synthesis of organic compounds such as methanol or methane, according to known industrial processes.

The remaining regenerated absorbent mixture is available to be used again in the purification of a gaseous mixture comprising sour gases.

Finally, it will be understood that further modifications and variations may be made to the process and to the compositions as described and illustrated herein which, although not specifically mentioned in the text, are nevertheless to be considered comprised as obvious variants of the present disclosure within the scope of the appended claims.

The invention claimed is:

1. Absorbent mixture usable for removal of sour gases from gas mixtures containing them, comprising:
   (A) at least one alcohol of general formula $R(OH)_n$ having a normal boiling point equal to or above 100° C., wherein R is an alkyl or alkylaromatic group, linear or branched, optionally substituted, having a number of carbon atoms between 2 and 20 and n is a whole number varying between 1 and 20;
   (B) at least one organic base having a $pK_b$ of less than or equal to 3.2; and
   (C) an aprotic polar solvent having a dielectric constant ε at 25° C. greater than or equal to 30, a viscosity μ at 25° C. less than or equal to 14 cP, and a normal boiling point equal to or above 130° C., and
   wherein the components A), B) and C) are present in the following proportions by weight:
   B/A comprised between 0.1 and 1.5;
   C/A comprised between 0.1 and 2.

2. Absorbent mixture of claim 1, wherein the absorbent mixture is nonaqueous.

3. Absorbent mixture of claim 1, wherein the solvent (C) is selected from the group consisting of sulfoxides, sulfones, and nitro aromatic compounds.

4. Absorbent mixture according to claim 1, wherein the aprotic polar solvent has a viscosity μ at 25° C. less than or equal to 12 cP and a normal boiling point above 160° C.

5. Absorbent mixture according to claim 1, wherein the organic base (B) has a $pK_b$ comprised between 0.3 and 3.0 and a boiling point above 100° C.

6. Absorbent mixture according to claim 1, wherein the organic base (B) is a nitrogenated organic compound comprising from 5 to 25 atoms of C and from 1 to 10 atoms of N.

7. Absorbent mixture according to claim 1, wherein the organic base (B) is a cyclic amidine having pKb comprised between 0.3 and 3.

8. Absorbent mixture according to claim 1, wherein the R group in alcohol (A) having formula $R(OH)_n$, is an alkyl group having from 2 to 20 carbon atoms, or an alkylaromatic group having from 7 to 20 carbon atoms and is optionally substituted with 1 to 5 chlorine or fluorine atoms.

9. Absorbent mixture according to claim 1, wherein the alcohol (A) is selected from any one of the following classes:
   aliphatic alcohols, linear or branched, optionally fluorinated, having a single —OH group (n=1) and 5 to 15 carbon atoms;
   aliphatic polyols having 2 to 10 —OH groups (n from 2 to 10) and 2 to 20 carbon atoms;
   alkylaromatic alcohols having 1 to 3 aliphatic —OH (n from 1 to 3) and 7 to 15 carbon atom groups, comprising at least one aryl group.

10. Absorbent mixture according to claim 1, wherein the aprotic polar solvent (C) is chosen from among the compounds or mixtures of compounds having the following characteristics:
    Dielectric constant ε at 25° C. comprised between 35 and 60;
    viscosity μ at 25° C. comprised between 2 and 12 cP, and boiling temperature at normal pressure equal to or above 130° C.

11. Process for the removal of sour gases from a gaseous mixture containing them, comprising the following stages in sequence:
    (a) placing the gaseous mixture, at a temperature comprised between 0° C. and 70° C., in contact with a solvent system comprising an absorbent mixture according to claim 1, to obtain a purified gaseous mixture and a liquid solution comprising at least part of the sour gases;
    (b) separating the purified gaseous mixture from the liquid solution obtained in stage (a);
    (c) regenerating the solvent system usable in stage (a) and forming a separate gaseous mixture comprising the sour gases.

12. Process according to claim 11, further comprising a stage (d) wherein the solvent system regenerated in stage (c) is recycled to the stage (a).

13. Process according to claim 11, wherein the gaseous mixture containing sour gases fed to stage (a) is composed of natural gas or exhaust smoke from a combustion process.

14. Process according to claim 11, where the stages (a) and (b) are conducted contextually in the same apparatus.

15. Process according to claim 11, wherein the purified gaseous mixture obtained in stage (b), or in stages (a)+(b) contextually, is a natural gas with an $H_2S$ content below ppm.

16. Process according to claim 11, wherein, in the stage (c), the liquid solution from stage (b) is heated to temperatures between 70° C. and 180° C.

17. Process according to claim 16, wherein the liquid solution from stage (b) is heated to temperatures between 80° C. and 150° C.

18. Process according to claim 11, wherein the stage (c) is conducted by flash mode, optionally by preheating the liquid solution obtained in stage (b) to temperatures between 70 and 150° C.

* * * * *